(12) United States Patent
Yuan

(10) Patent No.: US 10,700,401 B2
(45) Date of Patent: *Jun. 30, 2020

(54) FILTER AND COMMUNICATION DEVICE COMPRISING DIELECTRIC RESONATORS HAVING FREQUENCY ADJUSTING HOLES AND NEGATIVE COUPLING HOLES OF GREATER DEPTH

(71) Applicant: Huawei Technologies Co. Ltd., Shenzhen (CN)

(72) Inventor: Bengui Yuan, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 15/981,070

(22) Filed: May 16, 2018

(65) Prior Publication Data

US 2018/0269914 A1    Sep. 20, 2018

Related U.S. Application Data

(63) Continuation of application No. 14/952,615, filed on Nov. 25, 2015, now Pat. No. 9,998,163, which is a continuation of application No. PCT/CN2013/076539, filed on May 31, 2013.

(51) Int. Cl.
  *H01P 1/20* (2006.01)
  *H01P 1/205* (2006.01)
  (Continued)

(52) U.S. Cl.
  CPC .......... *H01P 1/2002* (2013.01); *H01P 1/2056* (2013.01); *H01P 1/2084* (2013.01);
  (Continued)

(58) Field of Classification Search
  CPC ...... H01P 1/2002; H01P 1/205; H01P 1/2053; H01P 1/2056; H01P 7/04; H01P 1/213
  (Continued)

(56) References Cited

U.S. PATENT DOCUMENTS

| 4,691,179 A | 9/1987 | Blum et al. |
| 4,837,534 A | 6/1989 | Van Horn |

(Continued)

FOREIGN PATENT DOCUMENTS

| CN | 1409434 A | 4/2003 |
| CN | 2901597 Y | 5/2007 |

(Continued)

OTHER PUBLICATIONS

Zhang, Y., "Modeling and Design of Microwave-Milimeterwave Filters and Multiplexers," Dissertation submitted to the Faculty of the Graduate School of the University of Maryland, College Park in partial fulfillment of the requirements for the degree of Doctor of Philosophy, 2006, 316 pages.

*Primary Examiner* — Benny T Lee
(74) *Attorney, Agent, or Firm* — Slater Matsil, LLP

(57) ABSTRACT

Embodiments relate to the field of technologies of components of communications devices, and provide a dielectric filter, which resolves a problem that a solid dielectric filter has a difficulty in implementing capacitive coupling. The dielectric filter includes at least two dielectric resonators, where each of the dielectric resonators includes a body made of a solid dielectric material, and an adjusting hole located on a surface of the body. The adjusting hole is a blind hole, configured to adjust a resonance frequency of the dielectric resonator on which the blind hole is located. The bodies of all the dielectric resonators included by the dielectric filter form a body of the dielectric filter.

19 Claims, 2 Drawing Sheets

(51) Int. Cl.
*H04B 1/38* (2015.01)
*H01P 1/213* (2006.01)
*H01P 1/208* (2006.01)
*H01P 7/10* (2006.01)
*H04B 1/40* (2015.01)

(52) U.S. Cl.
CPC ............... *H01P 1/213* (2013.01); *H01P 7/10* (2013.01); *H04B 1/38* (2013.01); *H04B 1/40* (2013.01)

(58) Field of Classification Search
USPC ........................................ 333/203, 222, 202
See application file for complete search history.

(56) References Cited

U.S. PATENT DOCUMENTS

| | | | |
|---|---|---|---|
| 5,818,312 A | 10/1998 | Noguchi et al. | |
| 5,828,275 A | 10/1998 | Kita et al. | |
| 6,002,306 A | 12/1999 | Arakawa | |
| 6,002,311 A | 12/1999 | Wey et al. | |
| 6,150,906 A | 11/2000 | Lee et al. | |
| 9,998,163 B2 * | 6/2018 | Yuan | H01P 1/2084 |
| 2003/0062973 A1 | 4/2003 | Endou et al. | |
| 2009/0231064 A1 | 9/2009 | Bates et al. | |

FOREIGN PATENT DOCUMENTS

| | | |
|---|---|---|
| CN | 201773922 U | 3/2011 |
| CN | 102509826 A | 6/2012 |
| CN | 202275899 U | 6/2012 |
| CN | 103050752 A | 4/2013 |
| JP | S62183603 A | 8/1987 |
| JP | S63109601 A | 5/1988 |
| JP | H0451603 A | 2/1992 |
| JP | H04103202 A | 4/1992 |
| JP | H06303008 A | 10/1993 |
| JP | H11220307 A | 8/1999 |
| KR | 20000014852 A | 3/2000 |
| WO | 2008019307 A2 | 2/2008 |

* cited by examiner

FILTER AND COMMUNICATION DEVICE COMPRISING DIELECTRIC RESONATORS HAVING FREQUENCY ADJUSTING HOLES AND NEGATIVE COUPLING HOLES OF GREATER DEPTH

CROSS-REFERENCE TO RELATED APPLICATIONS

This application is a continuation of U.S. patent application Ser. No. 14/952,615, Filed on Nov. 25, 2015, which is a continuation of International Application No. PCT/CN2013/076539, filed on May 31, 2013. The afore-mentioned patent applications are hereby incorporated by reference in their entireties.

TECHNICAL FIELD

The present invention relates to components of communications devices, and in particular, to a dielectric filter, a transceiver, and a base station.

BACKGROUND

Radio frequency filters are components frequently used in communications devices, and have many types and forms. Metal coaxial cavity filters in the radio frequency filters are applied to radio frequency front-ends of high-power wireless communications base stations due to their desirable performance indicators (including an insertion loss and a power capacity).

As wireless communications technologies develop, wireless communications base stations are distributed in an increasingly dense manner. It is required that volumes of the base stations become increasingly small. A radio frequency front-end filter module occupies a relatively large proportion of a volume of a base station. Therefore, a filter is also required to have an increasingly small volume. However, when a volume of a metal coaxial cavity filter is reduced, it is found that a smaller volume of the filter results in a greater surface current, a greater loss, and a lower power bearing capability, that is, a smaller power capacity. That is, with a decrease in the volume of the metal coaxial cavity filter, performance indicators of the metal coaxial cavity filter deteriorate.

At present, there is a miniaturized filter that uses a body made of a solid dielectric material and a resonator that is formed by metalizing (for example, by plating silver) a surface of the body (a solid dielectric resonator). Multiple resonators and coupling between the resonators form a filter (e.g. a solid dielectric filter). The coupling between the resonators may be classified by polarity, for example as positive coupling (which may also be referred to as "inductive coupling") and negative coupling (which may also be referred to as "capacitive coupling"). A transmission zero may be formed based on a polarity of coupling between the resonators. The transmission zero refers to a frequency outside a passband of a filter, and a degree of suppression that is applied by the filter on a signal at the frequency is theoretically infinite. The addition of a transmission zero can effectively enhance a near-end suppression capability of the filter (that is, a suppression capability of a frequency near the passband). For example, in a three-cavity filter with resonators 1, 2, and 3, if coupling between resonators 1 and 2, coupling between resonators 2 and 3, and coupling between resonators 1 and 3 are positive coupling, a transmission zero is formed on the upper side of a passband. However, if the coupling between the resonators 1 and 2, and the coupling between the resonators 2 and 3 are positive coupling, and the coupling between the resonators 1 and 3 is negative coupling, a transmission zero is on the lower side of the passband. To implement negative coupling, structures shown in FIG. 1a and FIG. 1b are currently used in a solid dielectric filter. A mechanical part 10 (FIG. 1a) having at least one surface of which is metalized, is connected between two solid dielectric resonators 11 and 12 (FIG. 1a). The two solid dielectric resonators are separated by using a groove 13. The resonator 11 and the mechanical part 10 are coupled by an electric field, to form a current on the mechanical part 10. The current flows to the resonator 12 along the mechanical part 10. The mechanical part 10 and the resonator 12 are coupled by an electric field, thereby forming capacitive coupling between the two resonators.

However, because the interior of the solid dielectric resonator is a solid medium instead of air, and the solid medium is formed by die casting, an implementation technique of a metalized mechanical part inside the solid medium is very difficult, and a coupling degree of the capacitive coupling cannot be adjusted.

SUMMARY OF THE INVENTION

Embodiments provide a dielectric filter, which resolves an existing problem that a solid dielectric filter has a difficulty in implementing capacitive coupling.

To achieve the foregoing objective, the following technical solutions are used in the embodiments.

According to a first aspect, the present invention provides a dielectric filter. The dielectric filter includes at least two dielectric resonators. Each of the dielectric resonators includes a body made of a solid dielectric material, and an adjusting hole extending from a surface of the respective body. Each of the adjusting holes is a blind hole, configured to adjust a resonance frequency of the respective dielectric resonator on which the blind hole is disposed. The bodies of all the dielectric resonators included by the dielectric filter form a body of the dielectric filter. The dielectric filter further includes at least one negative coupling hole, where each of the negative coupling hole extends from a surface of the body of the dielectric filter. The two dielectric resonators are connected to each other, with a point of connection being adjacent to the negative coupling hole. The negative coupling hole extends from a respective surface of each of the two dielectric resonators. The negative coupling hole is a blind hole, configured to implement capacitive coupling between the two dielectric resonators. A conducting layer covers the surface of the body of the dielectric filter, a surface of each adjusting hole, and a surface of the negative coupling hole.

In a first possible implementation manner according to the first aspect, a depth of the negative coupling hole is at least twice the depths of each of the adjusting holes of the two dielectric resonators connected to the location of the negative coupling hole is located.

In a second possible implementation manner according to the first aspect or the first possible implementation manner of the first aspect, the depth of the negative coupling hole is related to a frequency of a transmission zero of the dielectric filter.

In a third possible implementation manner according to the first aspect or the first or second possible implementation manner of the aspect first, a quantity of the negative coupling holes is equal to a quantity of transmission zeros of the dielectric filter.

In a fourth possible implementation manner according to the first aspect or any one of the first to third possible implementation manners of the first aspect, the two dielectric resonators from which the negative coupling hole extends are related to the frequency of the transmission zero of the dielectric filter.

In a fifth possible implementation manner according to the first aspect or any one of the first to fourth possible implementation manners of the first aspect, a surface of a connecting part that connects the at least two dielectric resonators includes a conducting layer.

In a sixth possible implementation manner according to the first aspect or any one of the first to fifth possible implementation manners of the first aspect, a part of the surface of the negative coupling hole is not covered by the conducting layer.

In a seventh possible implementation manner according to the sixth possible implementation manner of the first aspect, an area of the part of the surface of the negative coupling hole, which is not covered by the conducting layer, is related to a coupling degree of the capacitive coupling between the two dielectric resonators from which the negative coupling hole extends.

In an eighth possible implementation manner according to the first aspect or any one of the first to seventh possible implementation manners of the first aspect, a part of the surface of the adjusting hole is not covered by the conducting layer.

In a ninth possible implementation manner according to the eighth possible implementation manner of the first aspect, an area of the part of the surface of the adjusting hole, which is not covered by the conducting layer, is related to the resonance frequency of the dielectric resonator on which the adjusting hole is located.

In a tenth possible implementation manner according to the first aspect or any one of the first to ninth possible implementation manners of the first aspect, the solid dielectric material is ceramic.

According to a second aspect, embodiments provide a transceiver, including the dielectric filter provided according to the first aspect or any one of the first to tenth possible implementation manners of the first aspect.

According to a third aspect, embodiments provide a base station, including the transceiver provided in the second aspect.

According to the dielectric filter, the transceiver, and the base station that are provided by the embodiments, because of punching a blind hole on a body made of a solid dielectric material, capacitive coupling is formed between resonators on two sides of the blind hole, a manufacturing technique of a structure that implements capacitive coupling is simplified.

BRIEF DESCRIPTION OF DRAWINGS

To describe the technical solutions in the embodiments of the present invention or in the prior art more clearly, the following briefly introduces the accompanying drawings required for describing the embodiments or the prior art.

DETAIL DESCRIPTION OF THE PREFERRED EMBODIMENTS

The following clearly describes the technical solutions in the embodiments with reference to the accompanying drawings in the embodiments of the present invention.

Figure 1A:
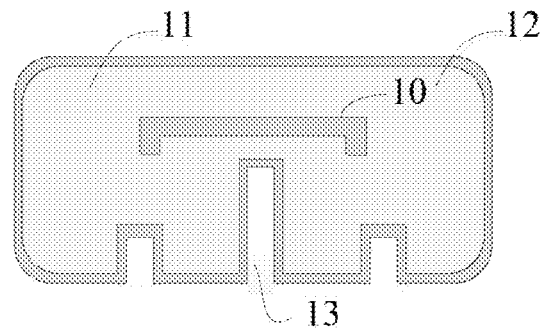
FIG. 1a is a schematic sectional view of a structure in a solid dielectric filter that is used to implement capacitive coupling in the prior art.
Figure 1B:
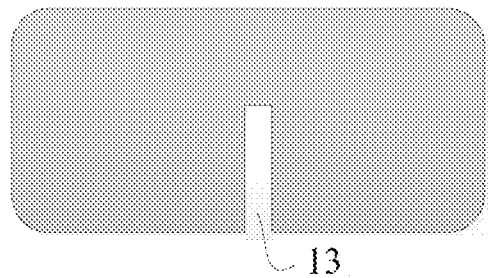
FIG. 1b is a side view of a structure in a solid dielectric filter that is used to implement capacitive coupling in the prior art.
Figure 2A:
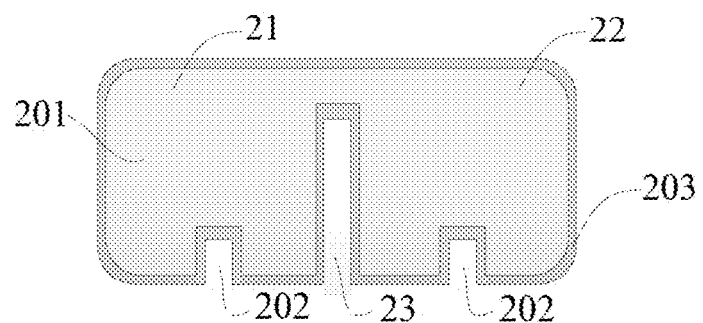
FIG. 2a is a schematic sectional view of a structure in a dielectric filter that is used to implement capacitive coupling according to an embodiment.
Figure 2B:
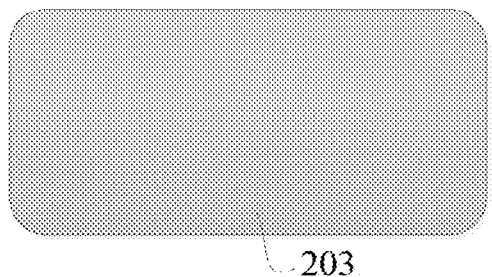
FIG. 2b is a side view of a structure in a dielectric filter that is used to implement capacitive coupling according to an embodiment.

An embodiment provides a dielectric filter. As shown in FIG. 2a and FIG. 2b, the dielectric filter includes at least two dielectric resonators (21, 22), where each of the dielectric resonators (21, 22) includes a body 201 made of a solid dielectric material, and a blind hole 202 extending from on a surface of the body and configured to adjust a resonance frequency (e.g. an adjusting hole), and the bodies of all the dielectric resonators included by the dielectric filter to form a body of the dielectric filter. The dielectric filter further includes at least one negative coupling hole 23 configured to implement capacitive coupling between the dielectric resonator 21 and the dielectric resonator 22. The negative coupling hole 23 is located adjacent to a surface of the body at which the two dielectric resonators are connected, and extends from a surface of each of the two dielectric resonators. The dielectric filter further includes a conducting layer 203 covering the surface of the body of the dielectric filter, a surface of each adjusting hole, and a surface of the negative coupling hole. Usually, a negative coupling hole extends from a surface of the body in the middle of two adjusting holes. The negative coupling hole and a body around the negative coupling hole form a structure similar to a resonator, and the negative coupling hole is similar to an adjusting hole of the resonator. A depth of the negative coupling hole is greater than the depths of each of the adjusting holes on two sides of the negative coupling hole. The depth of the negative coupling hole is usually at least twice the depths of each of the adjusting holes on the two sides of the negative coupling hole, so that a resonance frequency of the resonator may be lower than resonance frequencies of the resonators on the two sides of the negative coupling hole, and is usually a half or less than a half of the resonance frequencies of the resonators on the two sides of the negative coupling hole, thereby forming capacitive coupling between the dielectric resonator 21 and the dielectric resonator 22. The depth of the negative coupling hole is designed according to a frequency of a transmission zero of the dielectric filter. Specifically, the depth of the negative coupling hole may be designed according to a specific requirement, for example, based on the frequency of the transmission zero, and is not limited herein. Usually, there is one negative coupling hole between the two dielectric resonators, and one transmission zero is implemented. There may be one or more negative coupling holes on the dielectric filter, and a quantity and positions of negative coupling holes (referring to between which two dielectric resonators where the negative coupling holes are located) may be determined according to a quantity of transmission zeros and frequencies of transmission zeros that are specifically required. Specifically, a quantity of negative coupling holes is equal to a quantity of transmission zeros of the dielectric filter. The two dielectric resonators connected to the location of the negative coupling hole is located are determined according to the frequency of the transmission zero of the dielectric filter.

The conducting layer may be a metalized layer, and specifically, may be formed by electroplating metal on the surface of the body. The metal may be silver, or may be another metal that satisfies a specific requirement.

During specific manufacturing, the body with the adjusting holes and the negative coupling hole may be obtained using integrated molding, and then the surface of the body is metalized, for example, the surface is electroplated, to obtain the foregoing dielectric filter. In this case, the bodies of the dielectric resonators included by the dielectric filter are continuous. The dielectric filter is obtained using integrated molding, so that a manufacturing technique can be easier.

Figure 3:
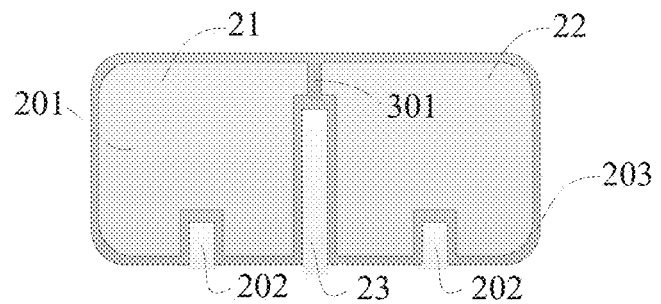
FIG. 3 is a schematic view of a structure in a dielectric filter that is used to implement capacitive coupling according to an embodiment.

FIG. 3 is a schematic view of a structure in a dielectric filter. FIG. 3 depicts certain features that are the same as, or similar to, features shown in FIG. 2A, including: dielectric resonators 21 and 22, negative coupling hole 23, body 201, blind hole 202, and conducting layer 203. As shown in FIG. 3, a surface on which the dielectric resonators that are included by the dielectric filter are connected may also include a conducting layer 301 (FIG. 3). During specific manufacturing, a dielectric resonator with an adjusting hole and a part of a negative coupling hole may be manufactured first, where the dielectric resonator is formed by a body and a conducting layer. A dielectric filter is formed by connecting conducting layers of at least two such dielectric resonators, and a specific connection manner may be welding, sintering, or the like, which may not be limited in this embodiment of the present invention. In the formed dielectric filter, the part of the negative coupling hole of the dielectric resonator, and a part of a negative coupling hole of another dielectric resonator that is connected to the dielectric resonator form a complete negative coupling hole.

Figure 4:
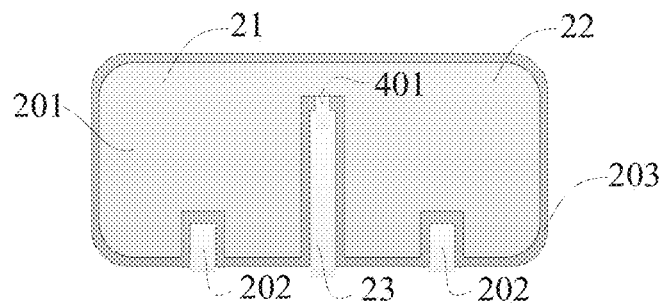
FIG. 4 is a schematic view of a structure in a dielectric filter that is used to implement capacitive coupling according to an embodiment.

FIG. 4 is a schematic view of a structure in a dielectric filter. FIG. 4 depicts certain features that are the same as, or similar to, features shown in FIG. 2A, including dielectric resonators 21 and 22, negative coupling hole 23, body 201, blind hole 202, and conducting layer 203. As shown in FIG. 4, a part 401 (FIG. 4) of the surface that defines the negative coupling hole may not be covered by the conducting layer. FIG. 4 is a schematic view that uses the dielectric filter shown in FIG. 2a as an example, and is also applicable to another dielectric filter provided by an embodiment of the present invention. An area of the part of the surface that defines the negative coupling hole, which is not covered by the conducting layer, is related to a coupling degree of the capacitive coupling between the two dielectric resonators that are connected to the location of the negative coupling hole. That is, a part of the conducting layer inside the negative coupling hole may be removed, to adjust the resonance frequency of the structure similar to the resonator that is formed by the negative coupling hole and the body around the negative coupling hole, thereby adjusting a coupling degree between resonators that are on two sides of the negative coupling hole. By adjusting a size of an area inside the negative coupling hole, from which the conducting layer is removed, the coupling degree of the capacitive coupling between the dielectric resonator 21 (FIG. 4) and the dielectric resonator 22 (FIG. 4) may be changed. Specifically, the area of the part inside the negative coupling hole, from which the conducting layer is removed, may be adjusted in a polishing manner, which may not be limited in this embodiment of the present invention. The part from which the conducting layer is removed may be located at an inner bottom or on an inner side inside the negative coupling hole, and may be one position, or may be multiple discontinuous positions.

Each of the dielectric resonators may include one or more adjusting holes, and a specific quantity of adjusting holes may be designed according to a specific requirement.

Figure 5:
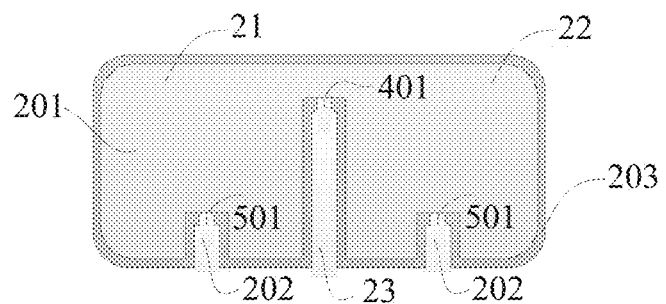
FIG. 5 is a schematic view of a structure in a dielectric filter that is used to implement capacitive coupling according to an embodiment.

FIG. 5 is a schematic view of a structure in a dielectric filter. FIG. 5 depicts certain features that are the same as, or similar to, features shown in FIG. 2A, including: dielectric resonators 21 and 22, negative coupling hole 23, body 201, blind hole 202, and conducting layer 203. FIG. 5 further depicts part 401, for example as discussed in connection with FIG. 4. As shown in FIG. 5, a part 501 of the surface that defines the adjusting hole may not be covered by the conducting layer. FIG. 5 is a schematic view that uses the dielectric filter shown in FIG. 4 as an example, and is also applicable to another dielectric filter provided by an embodiment. An area of the part of the surface that defines the adjusting hole, which is not covered by the conducting layer, is related to the resonance frequency of the dielectric resonator on which the adjusting hole is located. That is, a part of the conducting layer inside the adjusting hole may be removed, to adjust the resonance frequency of the resonator on which the adjusting hole is located. Specifically, the resonance frequency may be changed by adjusting a size of an area inside the adjusting hole, from which the conducting layer is removed. The area of the part inside the adjusting hole, from which the conducting layer is removed, may be adjusted in a polishing manner, which may not be limited in this embodiment. The part from which the conducting layer is removed may be located at an inner bottom or on an inner side inside the adjusting hole, and may be one position, or may be multiple discontinuous positions, which may be specifically designed according to a specific requirement. A conducting layer inside a blind hole on a body is removed to implement an adjustment of a resonance frequency, so that the resonance frequency is kept better.

The adjusting hole or the negative coupling hole may be in a shape of a rectangle or a circle, or may be in another shape, which may not be limited in this embodiment.

In the dielectric filter provided by the embodiments, because in a manner of punching a blind hole on a body made of a solid dielectric material, capacitive coupling is formed between resonators on two sides of the blind hole, a manufacturing technique of a structure that implements capacitive coupling is simplified. Further, an adjustment of a coupling degree of capacitive coupling may be implemented by adjusting a size of an area of a part removed from a conducting layer inside the punched blind hole.

The dielectric material used in the dielectric filter that is provided by the foregoing embodiments is preferably ceramic. Ceramic has a high dielectric constant (which is 36), and has both desirable hardness and desirable high temperature resistant performance; therefore, ceramic becomes a dielectric material frequently used in the field of radio frequency filters. Certainly, other materials such as glass and electrical-insulating macromolecular polymer known by a person skilled in the art may also be selected as the dielectric material.

The dielectric filter provided in the embodiments is mainly used for a radio frequency front-end of a high-power wireless communications base station.

An embodiment further provides a transceiver, where the dielectric filter provided in the foregoing embodiments is used in the transceiver. The dielectric filter may be configured to filter a radio frequency signal.

An embodiment further provides a base station, where the transceiver provided in the foregoing embodiment is used in the base station.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A dielectric filter, comprising:
a plurality of dielectric resonators, each dielectric resonator of the plurality of dielectric resonators comprising:
a body made of a solid dielectric material; and
an adjusting hole disposed on one side of the body, the adjusting hole being a blind hole, and configured to adjust a resonance frequency of the respective dielectric resonator on which the respective adjusting hole is disposed;
wherein the dielectric filter further comprises:
a first negative coupling hole disposed between two adjacent dielectric resonators of the plurality of dielectric resonators, wherein the first negative coupling hole extends from a surface of each of the two adjacent dielectric resonators, and the first negative coupling hole is a blind hole that is configured to implement capacitive coupling between the two adjacent dielectric resonators, wherein the adjusting hole disposed on a first dielectric resonator of the two adjacent dielectric resonators has a first depth, the adjusting hole disposed on a second dielectric resonator of the two adjacent dielectric resonators has a second depth, the first negative coupling hole has a third depth, and the third depth is greater than the first depth and greater than the second depth; and
a conducting layer covering the dielectric filter, the conducting layer at least partially covering a respective surface of the adjusting hole of each dielectric resonator of the plurality of dielectric resonators, and the conducting layer at least partially covering a surface of the first negative coupling hole.

2. The dielectric filter according to claim 1, wherein the solid dielectric material is ceramic.

3. The dielectric filter according to claim 1, wherein the third depth of the first negative coupling hole is at least twice the first depth or the second depth.

4. The dielectric filter according to claim 1, wherein a depth of the first negative coupling hole is designed based on a frequency of a transmission zero of the dielectric filter.

5. The dielectric filter according to claim 1, wherein the dielectric filter comprises a plurality of negative coupling holes, the plurality of negative coupling holes including the first negative coupling hole, and a number of the plurality of negative coupling holes is equal to the quantity of transmission zeros of the dielectric filter.

6. The dielectric filter according to claim 1, wherein the two adjacent dielectric resonators of the plurality of dielectric resonators are designed to set a frequency of a transmission zero of the dielectric filter.

7. The dielectric filter according to claim 1, wherein a part of the surface of the first negative coupling hole is not covered by the conducting layer.

8. The dielectric filter according to claim 7, wherein an area of the part of the surface of the first negative coupling hole which is not covered by the conducting layer is designed to adjust a coupling degree of the capacitive coupling between the two adjacent dielectric resonators from which the first negative coupling hole extends.

9. The dielectric filter according to claim 1, wherein a part of the surface of one adjusting hole disposed on each dielectric resonator of the plurality of dielectric resonators is not covered by the conducting layer.

10. The dielectric filter according to claim 9, wherein an area of the part of the surface of the one adjusting hole which is not covered by the conducting layer is designed to adjust the resonance frequency of the respective dielectric resonator on which the one adjusting hole is located.

11. A communication apparatus, comprising a dielectric filter, wherein the dielectric filter comprises:
a plurality of dielectric resonators, each dielectric resonator of the plurality of dielectric resonators comprising:
a body made of a solid dielectric material; and
an adjusting hole disposed on one side of the respective body, the adjusting hole being a blind hole configured to adjust a resonance frequency of the respective dielectric resonator on which the respective adjusting hole is located; and the dielectric filter further comprising:
a first negative coupling hole disposed between two adjacent dielectric resonators of the plurality of dielectric resonators, wherein the first negative coupling hole extends from a surface of each of the two adjacent dielectric resonators, and the first negative coupling hole is a blind hole configured to implement capacitive coupling between the two adjacent dielectric resonators, wherein the adjusting hole disposed on a first dielectric resonator of the two adjacent dielectric resonators has a first depth, the adjusting hole disposed on a second dielectric resonator of the two adjacent dielectric resonators has a second depth, the first negative coupling hole has a third depth, and the third depth is greater than the first depth and greater than the second depth; and
a conducting layer covering the dielectric filter, the conducting layer at least partially covering a surface of the adjusting hole of each dielectric resonator of the plurality of dielectric resonators, and the conducting layer at least partially covering a surface of the first negative coupling hole.

12. The communication apparatus according to claim 11, wherein a part of the surface of one adjusting hole disposed on each dielectric resonator of the plurality of dielectric resonators is not covered by the conducting layer.

13. The communication apparatus according to claim 12, wherein an area of the part of the surface of the one adjusting hole which is not covered by the conducting layer is designed to adjust the resonance frequency of the respective dielectric resonator on which the one adjusting hole is located.

14. The communication apparatus according to claim 11, wherein the third depth of the first negative coupling hole is at least twice the first depth or the second depth.

15. The communication apparatus according to claim 11, wherein a depth of the first negative coupling hole is designed based on a frequency of a transmission zero of the dielectric filter.

16. The communication apparatus according to claim 11, wherein the dielectric filter comprises a plurality of negative coupling holes, the plurality of negative coupling holes including the first negative coupling hole, and a number of the plurality of negative coupling holes is equal to a quantity of transmission zeros of the dielectric filter.

17. The communication apparatus according to claim 11, wherein the two adjacent dielectric resonators of the plurality of dielectric resonators are designed to set a frequency of a transmission zero of the dielectric filter.

18. The communication apparatus according to claim 11, wherein a part of the surface of the first negative coupling hole is not covered by the conducting layer.

19. The communication apparatus according to claim 18, wherein an area of the part of the surface of the first negative coupling hole which is not covered by the conducting layer is designed to adjust a coupling degree of the capacitive coupling between the two adjacent dielectric resonators from which the first negative coupling hole extends.

\* \* \* \* \*